United States Patent [19]
Lowrie et al.

[11] Patent Number: 4,604,196
[45] Date of Patent: Aug. 5, 1986

[54] MARINE SEPARATOR FOR FLUIDS OF DIFFERENT DENSITIES

[75] Inventors: Neely E. Lowrie, Tulsa; Mitchel L. Rooker, Sand Springs, both of Okla.

[73] Assignee: Combustion Engineering, Inc., Windsor, Conn.

[21] Appl. No.: 755,520

[22] Filed: Jul. 16, 1985

[51] Int. Cl.⁴ ............................................. B01B 17/028
[52] U.S. Cl. ...................................... 210/136; 55/174; 55/176; 210/522; 210/540
[58] Field of Search ................... 210/136, 522, 540; 55/172–177

[56] References Cited

U.S. PATENT DOCUMENTS

| 2,825,422 | 3/1958 | Schoenfeld | 55/175 X |
| 2,868,312 | 1/1959 | Erwin | 55/175 X |
| 3,418,252 | 12/1968 | Francis, Jr. | 55/174 |
| 4,059,517 | 11/1977 | Staahorn et al. | 210/540 X |
| 4,073,734 | 2/1978 | Lowrie | 55/174 X |
| 4,308,144 | 12/1981 | Saito | 210/136 X |
| 4,470,905 | 9/1984 | Pangborn et al. | 210/136 |

Primary Examiner—John Adee

[57] ABSTRACT

A cylindrical horizontally extended vessel which receives a mixture of fluids of different densities. The separation of the fluids is provided a minimum of disturbance by the marine motions to which the separator system is subjected. The separating liquids of the mixture are isolated from marine movements by a compartment in the lower part of the separator which is check-valved to be maintained liquid packed. A table is formed above the compartment as a structure stabilizing the liquids so they may be separately withdrawn from the separator.

7 Claims, 9 Drawing Figures

MARINE SEPARATOR FOR FLUIDS OF DIFFERENT DENSITIES

TECHNICAL FIELD

The present invention relates to the separation of fluids having different densities while subjected to marine motions. More particularly, the invention relates to the separation of oil and gas well fluids while subjected to marine motions.

BACKGROUND ART

As the search for, and production of, mixtures of hydrocarbons and water moves into greater depths, the practical limit has been reached for drilling and production platforms anchored to the sea bottom. In deeper water, we will have to accept platforms which are mounted on flotation structures subjected to all six marine motions.

Separation of the well stream components must be carried out in vessels mounted on the flotation structures and, therefore, are subjected to the disruptive force of marine motions. All the conventional vessels utilized in separating these well stream fluids are being studied for modification in view of this marine environment.

Although the present invention will be reduced to practice in connection with oil and gas wells, the broader consideration of other mixutres of fluids of different densities are contemplated. Keep in mind that the hydrocarbon fluids are representative of all mixtures of fluids of different densities in this art.

Platform and ship-mounted process equipment must function properly under various amounts of marine movement. The worst part of a storm at sea may only last for 30 minutes, but if it causes significant process upset (such as carryover of oil out the gas line), then the entire facility may have to be shut down. Restarting a complex facility can require eight hours, which is a significant loss of production and revenue. Process vessels must be small due to offshore weight and space considerations, yet they must be able to function during the frequent storms which occur at sea. The answer to this difficult set of constraints is well designed vessel internals.

U.S. Pat. No. 4,073,734, Neely E. Lowrie, issued Feb. 14, 1978, has a disclosure including efficiently separating oil, water and gas from a subsea well. Although the 1978 structure was efficient for two-phase separation, additional structure is needed for three-phase separation subjected to marine motions. To understand the differences, the teachings of the 1978 patent are incorporated by reference.

Essentially, the 1978 patent provided a horizontal table or baffle extending substantially the length of the horizontally extended vessel. The height of the horizontal table or baffle was placed approximately at the expected interface between the oil and water strata within the separator. The water, with some oil, entered two compartments below the table, one in each half of the separator, through a centrally located well. The water entered the two compartments through apertures in the well wall leading into each compartment. The oil that entered the two compartments returned to the oil body above the horizontal baffle through vertical pipes penetrating the baffle. The water left the vessel through two outlets located near each end of the separator. The oil was removed from the vessel after it flowed over a vertical weir located at the far end of the separator from the inlet and above the horizontal baffle.

Further study of the 1978 disclosure and accumulation of additional facts and experience since the issue of that patent have indicated that significant improvements can be made. The sloshing of the liquids in and out of the central well in the horizontal table disturbed the gravity-separating process of the oil and water. Additional structure could be utilized to maintain better isolation of the fluid-packed compartment beneath the table. The present disclosure utilizes an alternate arrangement of structure within the separator which will eliminate the problems or limitations of the 1978 system. A significant factor that was not adequately considered in the 1978 patent is the major problem of foam reduction or decay.

DISCLOSURE OF THE INVENTION

The present invention contemplates restraining or containing the body of separating liquids in the lower volume of a horizontal separator vessel, mounted on a marine platform, to maintain a stable interface between the liquid bodies.

The invention further contemplates providing an oil-water interface in the liquid-packed compartment of a horizontal separator vessel to reduce the velocity and volume of movement of the liquids, and maximize the effectiveness of their gravity separation during marine motions.

Other objects, advantages and features of this invention will become apparent to one skilled in the art upon consideration of the written specification, appended claims, and attached drawings.

BRIEF DESIGNATION OF THE DRAWINGS

FIG. 1 is a sectioned elevation of a horizontal separator vessel to be mounted on a marine structure and embodies the invention;

FIG. 2 is a somewhat diagrammatic elevation of the separator of FIG. 1 as pitched to one extreme;

FIG. 3 is similar to FIG. 2, the separator as pitched to the alternate extreme;

FIG. 4 is a sectioned elevation of a horizontal separator vessel receiving the mixture of fluids to be separated at the center of the vessel and embodying the invention;

FIG. 5 is a somewhat diagrammatic elevation of the separator of FIG. 4 as pitched to one extreme;

FIG. 6 is similar to FIG. 5, the separator as pitched to the alternate extreme;

FIG. 7 is a sectioned elevation of a horizontal separator vessel embodying the invention as the fluids to be separated are divided to enter the vessel at opposite ends;

FIG. 8 is a somewhat diagrammatic elevation of the separator of FIG. 7 as pitched to one extreme; and FIG. 9 is similar to FIG. 8, the separator as pitched to the alternate extreme.

TERMS AND DEFINITIONS

The term "fluid" is used in the disclosure of the invention as including both liquid and gaseous phases. Oil is a fluid; water is a fluid; and both will be more specifically designated as liquid. Foam may be referred to as a liquid although it is more precisely identified as a combination of gas bubbles in oil.

When the term "mixture" is used, in this disclosure, it is to be understood that it may be a combination with varying amounts of oil, water, gas, and foam. Oil, water, and gas will be the final products separated by the disclosed system in which there is invention.

The spirit level is gravity's attempt to keep an interface horizontal. The surface of a fluid constantly seeks a horizontal plane. In a vessel with standard land-base internals, the spirit level is totally free to move. If this vessel is placed on a ship, the resultant constant spirit level movement causes the entire contents of the vessel to move back and forth on typically a 15-second period. This creates a large amount of turbulence that degrades separation. Also, the large vertical excursions of interfaces takes them dangerously close to outlet nozzles.

Internal structures (such as porous plates) which are restrictive enough to dampen the spirit level would generate such high velocities that they would mix the separating fluids. So the only way to dampen the spirit level is by fluid packing. This means to provide a compartment in which one of the two fluids is very small in quantity, or nonexistent. A bottle filled completely with water can be oscillated or accelerated any amount without generating turbulent eddies in the water. A process vessel fluid-packed compartment must allow continuous flow into and out of it. The proposed invention provides a high resolution fluid packing and an unrestricted process flow path.

The structure in which the invention is embodied is mounted within a cylindrical, horizontally extended vessel. The mixture is received into the separator vessel and controlled by baffles including a substantially flat, horizontally extended plate which may be referred to as a "table" or baffle. A compartment is formed beneath the table and with the lower part of the vessel. One or two "wells" are formed by vertical plates extending from the table to the bottom of the vessel. The vertical plates and the vessel wall form the well or wells.

BEST MODE FOR CARRYING OUT THE INVENTION

Each of FIGS. 1, 4 and 7 discloses the structure embodying the invention within horizontally extended cylindrical vessels. Each of the vessels receives one or more well streams which comprise varying ratios of oil, water, foam, and gas which include the useful products of oil and gas. Each vessel is mounted on a platform or ship which floats on the surface of the ocean. The marine movements induced in the platform or ship are transmitted to the separators mounted thereon. All six marine motions will not be analyzed. For the purposes of this description, only the pitch motion will be recognized in FIGS. 2, 3, 5, 6, 8 and 9 as the predominant motion. Only the effects of the pitch motion are illustrated, with the confidence that the invention will be fully disclosed thereby.

Within each of the horizontally extended separator vessels, a substantially horizontal table is mounted to extend parallel the axis of the vessel. A compartment is formed beneath this table with the lower wall of the vessel and one or more substantially vertical plates extending between the underside of the table and the inside surface of the vessel. The volume between the vertical plate and the end of the separator forms a well and communicates with the compartment through one or more check valves mounted through the vertical plate. The compartment, the one-way valve or check valves, and the well, embody the essential elements of the invention.

Figure 1:
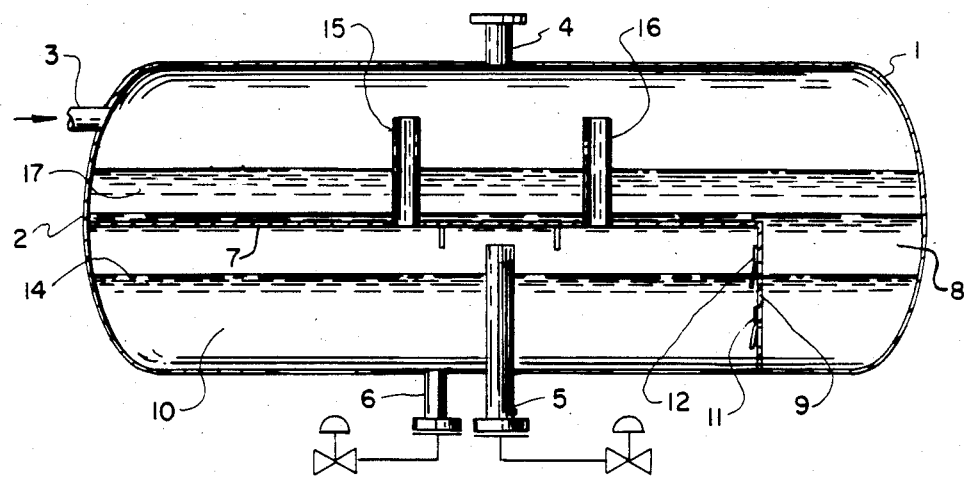
FIG. 1 discloses a horizontally extended cylindrical vessel 1. Available oil well production is directed into end 2 by means of inlet 3. The gas, oil, and water of the production are separated and separately removed from vessel 1. The gas leaves the center of the vessel through outlet 4, the separated oil leaves vessel 1 through outlet 5, and the water is removed through outlet 6.

The structure embodying the invention receives oil well production which may or may not contain a significant amount of foam. The liquid portion of the production entering the vessel gravitates to the upper surface of a substantially flat, horizontal table or baffle 7. The liquids then flow into a well 8 at one end of the vessel. It is, of course, practical to provide a well at each end of the vessel to receive the liquids; in either case, a vertical plate 9 forms a compartment 10 beneath table 7 and also forms well 8 with the vessel shell. The well and compartment are connected through apertures in vertical plate 9 by check valves 11 and 12. Outlet 6, through the vessel wall, removes water from compartment 10. Oil is removed from compartment 10 through outlet 5, and gas is removed at the top of vessel 1 through outlet 4. Check valves 11 and 12 provide access from well 8 to compartment 10. The two valves are placed in vertical alignment and at the level where upper valve 11 will admit oil into compartment 10 and valve 12 is placed to admit water into the compartment if there is a separation of the two phases in well 8. Both valves are referred to as check valves because they permit the flow of liquids only from well 8 into compartment 10 and prevent the liquids from flowing from the compartment back into the well. Thus, compartment 10 is liquid-packed at all times. Furthermore, the multiple valves preserve the desirable flow profile of liquid entering compartment 10.

The oil and water will form an interface 14 and the liquids drain individually through outlets 5 and 6. These outlets are positioned at a point in compartment 10 where the pitch of the vessel will have minimum disturbance on the interface in the compartment. Any gas evolved from the liquids in compartment 10 will ascend through one or both of conduits 15 and 16 for withdrawal through outlet 4. Returning to the entry of the well stream into the vessel through inlet 3, there may be varying amounts of foam 17 from the well stream which could carry over to the gas outlet 4.

As illustrated in FIG. 1, oil and water flow over the upper surface of table 7. This travel over the flat surface of table 7 is expected to decay foam to some extent. Table 7 is placed at the oil-foam interface to control the spirit level of that one interface. The small gas layer under the table produces only a minimal amount of fluid movement, turbulence, and vertical interface excursion. The same is true for the thin oil and water layer above the table. There is no method by which the oil and water layers in compartment 10 can flow to the right side of the vessel in FIG. 2, or to the left side of the vessel in FIG. 3. The oil and water layers in compartment 10 cannot lift or displace the foam. The foam-gas interface remains relatively stationary by virtue of the isolation of oil and water within compartment 10. Motion of fluids within the compartment cannot move fluid outside the compartment. Dry foam flows slowly by its own gravity forces relative to the typical 15-second periods of marine motion. Thus, foam layer 17 is calm and decays rapidly.

Figure 2:
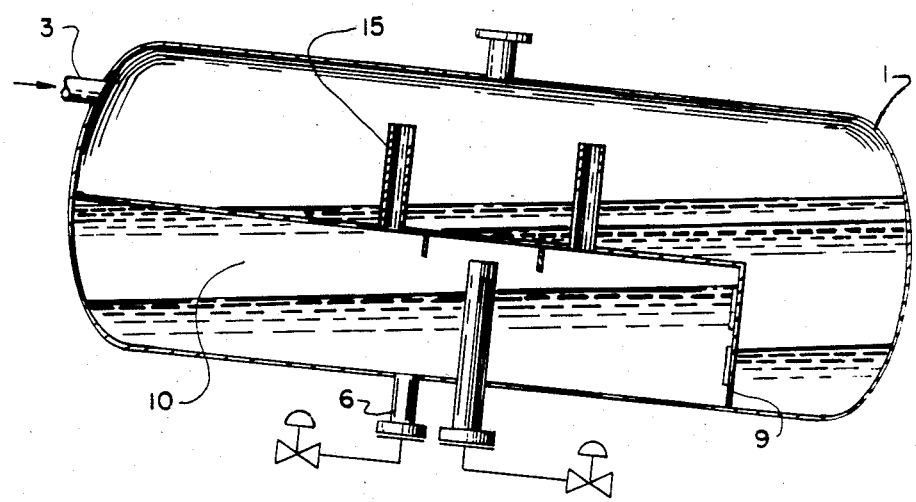
Figure 3:
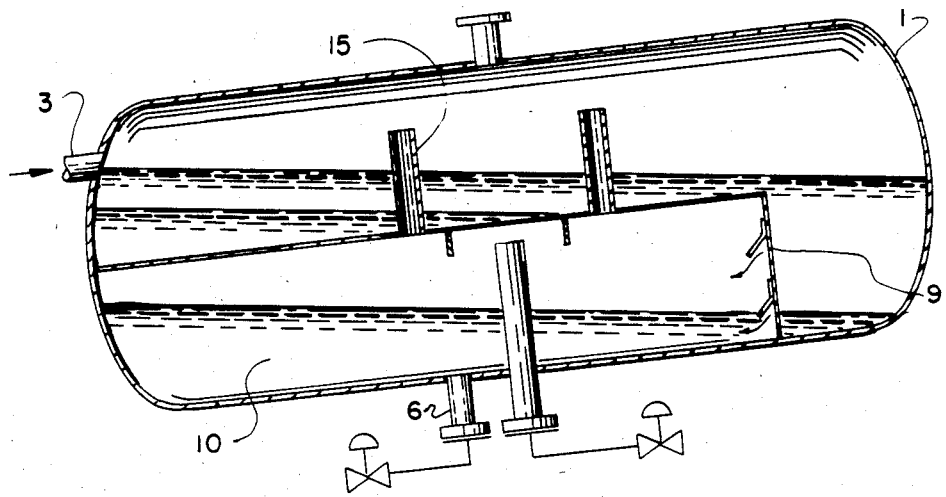

FIGS. 2 and 3 disclose vessel 1 at opposite peaks of the pitch movement. The levels of the liquids are disclosed to illustrate how the liquids separate under the pitch conditions and are withdrawn from the vessel.

Figure 4:
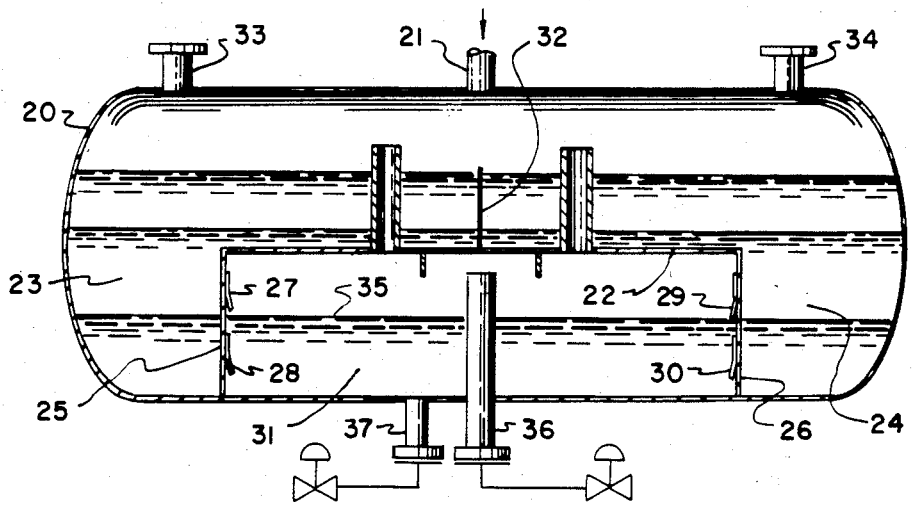
Figure 5:
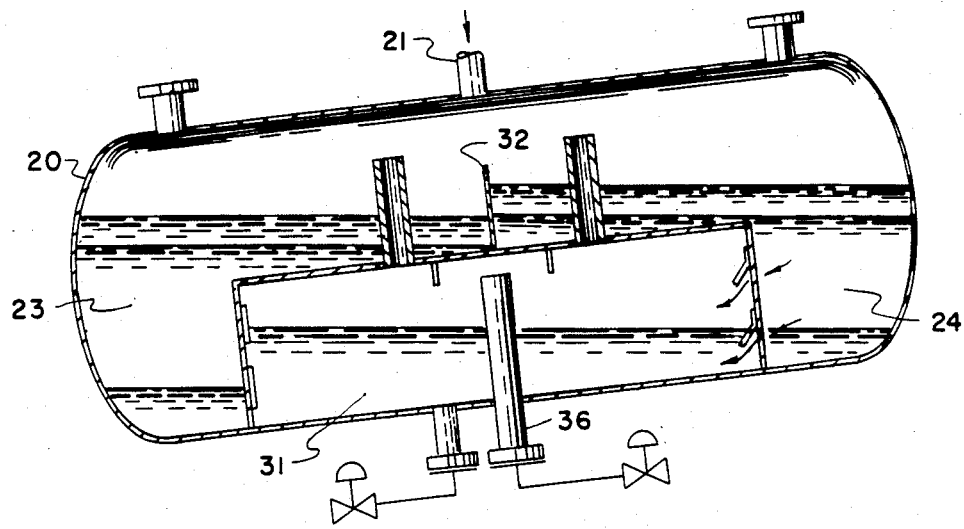
Figure 6:
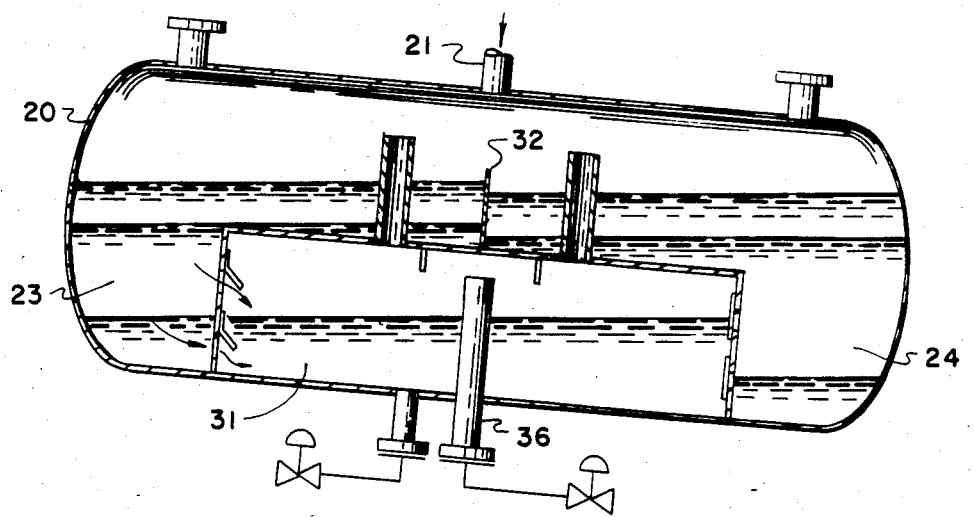

FIGS. 4, 5 and 6 disclose the invention and to an extent are duplicates of FIGS. 1, 2 and 3. Vessel 20 has a center inlet 21 for the fluid mixture requiring separation. A table or baffle 22 is extended horizontally at an expected height relative to the interface of the separating liquids. Wells 23 and 24 are formed at each end of the vessel and the liquids gravitate from the table into both wells. Vertical baffles 25 and 26 have check valves 27, 28, 29 and 30 so the liquids from both wells can flow into a compartment 31, while preventing flow from the compartment back into the wells. Inlet 21 flows the fluid mixture down onto the upper surface of table 22 and it is expected that the liquids will equally divide by a vertical baffle 32, extended from near inlet 21 to the table, and flow into each well. Baffle 32 not only divides the incoming fluids evenly to the table, but functions to dampen the flow of fluids on top of the table during the pitch movement of the separator vessel. Any gas evolved from the mixture will pass from vessel 20 through outlets 33 and 34. Again, an interface 35 between the oil and water within compartment 31 will remain relatively stable during the expected pitch. At least, the interface will be stable enough to ensure that oil outlet 36 will always withdraw oil from the upper liquid body and outlet 37 will withdraw water from the lower liquid body in the compartment during pitch. Both oil and water outlets are positioned near the center of the vessel length in order to withdraw oil and water from the compartment. Check valves 27, 28, 29 and 30 in vertical baffles 25 and 26 ensure that flow will be into and not out of the chamber. In this configuration, the fluids initially flow on top of table 22 where some degassing occurs, thus preventing gas and foam being carried with the liquids into compartment 31.

The liquid levels are represented in FIGS. 5 and 6 to indicate how compartment 31 receives the liquids and prevents their flowing back into the wells. This arrangement once again illustrates the invention which produces a stabilization of interfaces with a resultant higher purity of separation during marine movement.

Figure 7:
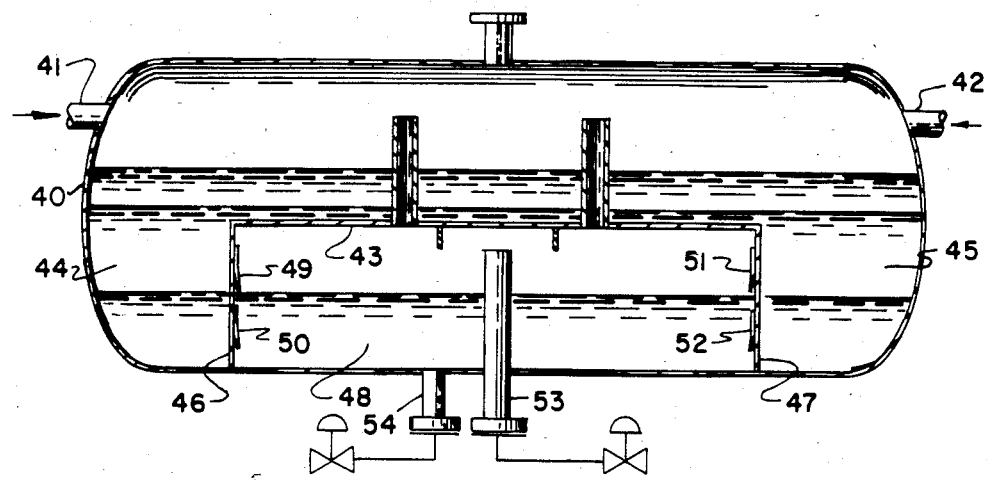

In FIG. 7, vessel 40 has two inlets 41 and 42 to receive the fluid mixture to be separated. There are situations which dictate the use of two inlets, one at each end of the vessel. A table or baffle 43 receives the mixture from the two inlets and wells 44 and 45 are formed in each end of the vessel by vertical plates 46 and 47, precisely as in FIG. 4. The liquid mixture flows from each well through the vertical plates and into a compartment 48 beneath the table. Check valves 49, 50, 51 and 52 control the one-way flow of the mixture from each well into compartment 48. The points of withdrawal through outlets 53 and 54 are positioned near the center of the vessel length, as in FIGS. 1 and 4.

Figure 8:
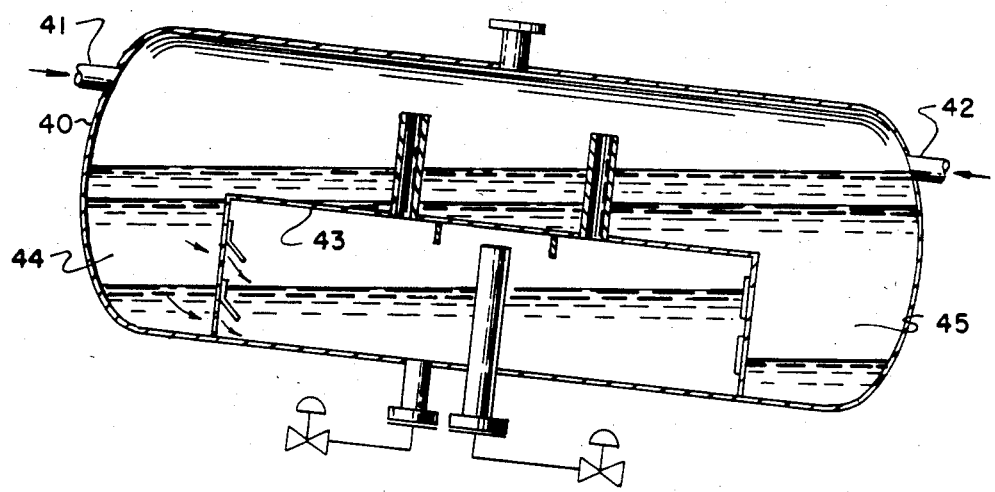
Figure 9:
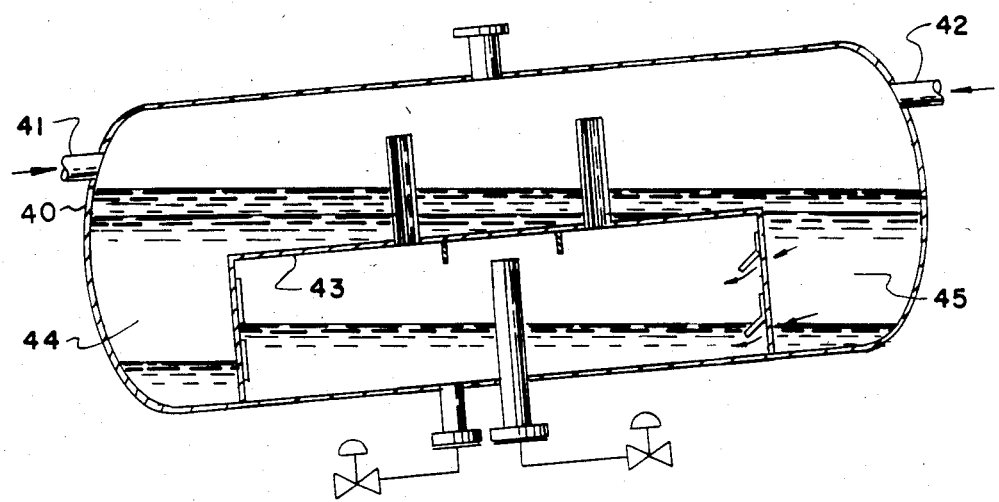

The liquid levels are represented in FIGS. 8 and 9 to indicate how compartment 48 receives the liquids and prevents their flowing back into the wells. Thus, the invention is embodied within this structure and the embodying structure is consistant with FIGS. 1 and 4.

From the foregoing, it will be seen that this invention is one well adapted to attain all the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

We claim:

1. A separation system for a plurality of fluids having different densities and subject to marine motions, including,
    a cylindrical separator vessel extending horizontally and having an inlet to receive a plurality of fluids having different densities,
    a substantially flat and horizontal table/baffle mounted internally and extended a major length of the vessel and parallel the vessel axis to receive and spread the fluids from the inlet to a well formed at one end of the vessel by a substantially vertical plate sealed to the table and extending down to the bottom of the vessel,
    a liquid-packed compartment formed between the underside of the table and substantially vertical plate and the lower wall of the vessel,
    at least one check valve mounted through the vertical plate between the well and the compartment to allow one-way flow of at least one fluid into the compartment from the well,
    an outlet conduit through the table communicating the compartment to the area above the table for the removal of the fluid of lesser density from the compartment,
    outlets from the compartment near the center of the compartment length for the separated fluids having the greater density,
    and an outlet through the vessel wall above the table for the fluid having the lessor density.

2. The separation system of claim 1, in which,
    the fluids of different densities are oil and water and gas and foam.

3. A separation system for a plurality of fluids having different densities and subject to marine motions, including,
    a cylindrical separator vessel extending horizontally and having a central inlet to receive a plurality of fluids having different densities,
    a substantially flat and horizontal table/baffle mounted internally and extended to within a predetermined distance from each end of the vessel and parallel the vessel axis to receive and spread the fluids from the inlet,
    a well formed at each end of the vessel by a substantially vertical plate sealed to the table and extending down to the bottom of the vessel,
    a compartment formed between the underside of the table and substantially vertical plates and the lower wall of the vessel,
    at least one check valve mounted through each substantially vertical plate between each well and the compartment to allow one-way flow of at least one fluid into the compartment from each well,
    outlets from the compartment near the center of the vessel length for the separated fluids having the greater density,
    and at least one outlet through the wall of the vessel and above the table for the fluid having the least density.

4. The separation system of claim 3, including,
a vertical baffle extending from the inlet to divide the fluids flowing through the inlet and functioning as a dampener to the fluids on the table during marine movement.

5. The separation system of claim 3, in which,
the fluids of different densities are oil and water and gas and foam.

6. A separation system for a plurality of fluids having different densities and subject to marine motions, including,
a cylindrical separator vessel extending horizontally and having an inlet in each end to receive a plurality of fluids having different densities,
a substantially flat and horizontal table/baffle mounted internally and extended to within a predetermined distance from each end of the vessel and parallel the vessel axis to receive and spread the fluids from the inlet,
a well formed at each end of the vessel by a substantially vertical plate sealed to the table and extending down to the bottom of the vessel,
a compartment formed between the underside of the table and vertical plates and the lower wall of the vessel
a check valve mounted through each substantially vertical plate between each well and the compartment to allow one-way flow of at least one fluid into the compartment from each well,
outlets from the compartment near the center of the vessel length for the separated fluids having the greater density,
and an outlet through the center of the vessel wall above the table for the fluid having the least density.

7. The separation system of claim 6, in which,
the fluids of different densities are oil and water and gas and foam.

* * * * *